United States Patent [19]

Moulinet

[11] Patent Number: 5,062,821
[45] Date of Patent: Nov. 5, 1991

[54] ARRANGEMENT OF A PROTECTIVE COVER ON THE SOCKET OF A TRANSMISSION JOINT

[75] Inventor: Francois Moulinet, Triel sur Seine, France

[73] Assignee: Glaenzer Spicer, Poissy, France

[21] Appl. No.: 367,712

[22] Filed: Jun. 19, 1989

[30] Foreign Application Priority Data

Jun. 22, 1988 [FR] France ............... 88 08391

[51] Int. Cl.$^5$ .............................................. F16D 3/84
[52] U.S. Cl. ...................................... 464/111; 464/905
[58] Field of Search ............... 464/111, 123, 124, 133, 464/170, 905, 175

[56] References Cited

U.S. PATENT DOCUMENTS

| | | | |
|---|---|---|---|
| 1,298,680 | 4/1919 | Dunham | 464/170 X |
| 1,834,906 | 12/1931 | Smith et al. | |
| 1,933,072 | 10/1933 | Ricefield | 464/123 X |
| 3,643,468 | 2/1972 | Kleinschmidt et al. | 464/124 |
| 3,818,721 | 6/1974 | Wahlmark | 464/111 |
| 4,083,202 | 4/1978 | Westercamp | 464/111 X |
| 4,224,806 | 9/1980 | Kobayashi | 464/111 |
| 4,540,385 | 9/1985 | Krude | 464/111 X |

FOREIGN PATENT DOCUMENTS

| | | |
|---|---|---|
| 1335645 | 7/1962 | France . |
| 1347808 | 11/1962 | France . |
| 1474969 | 2/1966 | France . |
| 2271444 | 12/1975 | France . |
| 152739 | 12/1979 | Japan ............... 464/111 |
| 474756 | 11/1937 | United Kingdom . |

Primary Examiner—Daniel P. Stodola
Attorney, Agent, or Firm—Wenderoth, Lind & Ponack

[57] ABSTRACT

A transmission joint of the type comprising a socket is connected to a first shaft. Inside the socket is formed at least one pair of rolling tracks in which a rolling element connected to a second shaft is received. A protective closing cover of a generally cylindrical form is mounted on the outer wall of the socket, with a gasket interposed in the vicinity of an end of the socket adjacent the first shaft. The other end of the cover keeps a free annular edge of a sealing bellows gripped between an inner cylindrical wall of the cover and an opposite socket portion. The cover is mounted on the socket in the vicinity of its two opposite ends so as to provide a radial play between the inner wall of the cover and a rough outer wall of the socket.

10 Claims, 1 Drawing Sheet

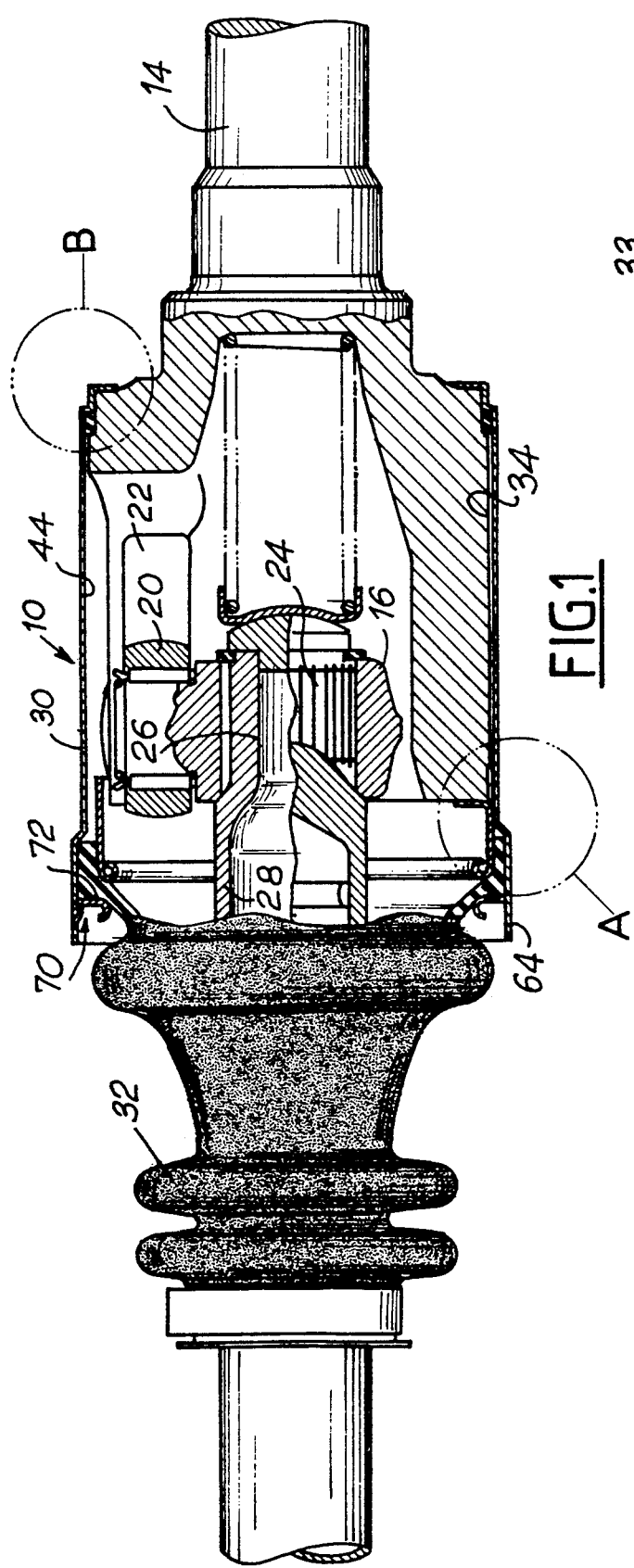
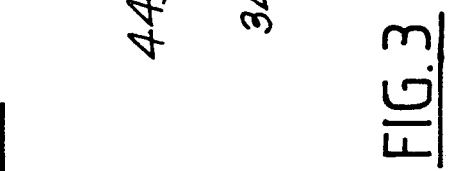
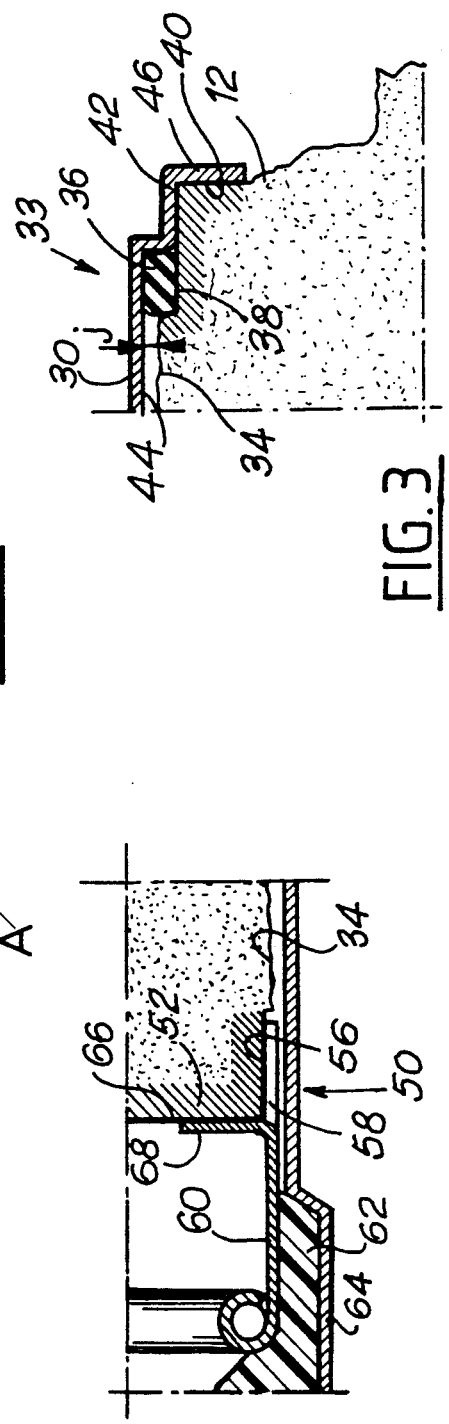

ARRANGEMENT OF A PROTECTIVE COVER ON THE SOCKET OF A TRANSMISSION JOINT

BACKGROUND OF THE INVENTION (1) Field of the Invention

The present invention relates to a transmission joint of the type comprising a socket, connected to a first shaft, and inside which is formed at least one pair of rolling tracks. A rolling element connected to a second shaft is received in the rolling tracks, and a protective closing cover of a generally cylindrical form is mounted on the outer wall of the socket, with a gasket interposed in the vicinity of the end of the socket adjacent the first shaft. The other end of the socket keeps a free annular edge of a sealing bellows gripped between the inner cylindrical wall of the cover and the opposite socket portion.

(2) State of the Prior Art

A transmission joint of the sliding tripod type conforming to this definition is described and illustrated in the document FR-A-2,538,476.

In this embodiment of a transmission joint, a cylindrical protective cover is mounted on an outer surface of a socket, the latter being machined to the same diameter over its entire axial length. A groove is formed at an end of the socket facing a first shaft, in order to receive a gasket which is installed before the operation of mounting the cover, the latter subsequently being crimped at its two ends, on the one hand directly on to the outer surface of the socket and on the other hand at the rear of the heel of the sealing bellows forming its free annular edge.

This type of mounting of the closing cover is especially costly in that it requires a complete facing of the outer cylindrical surface of the body of the socket. It also usually makes it necessary to machine the free ends of the journals of the tripod on which the rollers are mounted, so that the rough surfaces of these do not come into contact with the inner surface of the cover when the joint is in operation.

SUMMARY OF THE INVENTION

The object of the present invention is to provide a transmission joint of the above-mentioned type, which is more economical to produce and in which the mounting of the cover is especially simple.

To achieve this, the invention provides a transmission joint, characterized in that the cover is mounted on the socket in the vicinity of its two opposite ends so as to provide a radial play between the inner wall of the cover and the rough outer wall of the socket.

The end of the cover at the first shaft is mounted on a machined cylindrical portion of the outer wall of the socket, with a gasket interposed therebetween. The machined cylindrical portion is a portion of a diameter reduced in relation to the diameter of the rough surface of the socket. The machined portion is completed by a machined radial annular surface forming an axial stop surface which interacts with an inner radial shoulder of the cover.

The other end of the cylindrical cover is mounted centered about a machined cylindrical bearing zone of the outer surface of the socket. The bearing zone is a portion of a diameter reduced in relation to the diameter of the rough outer surface of the socket. The other end of the cylindrical body is mounted centered on the machined bearing surface, there being interposed a ring for supporting a free annular edge of a sealing bellows. The cylindrical cover is extended axially towards the second shaft by a widened portion which interacts with the free annular edge of the sealing bellows, a collar for the axial immobilization of the latter and of the cover relative to the socket being mounted snapped into the widened portion.

BRIEF DESCRIPTION OF THE DRAWINGS

Other characteristics and advantages of the invention will emerge from a reading of the following detailed description, for the understanding of which reference will be made to the accompanying drawings, in which:

FIG. 1 shows a view in axial section of an embodiment of the invention;

FIG. 2 is a view of a detail A of FIG. 1 on an enlarged scale; and

FIG. 3 is a view of a detail B of FIG. 1 on an enlarged scale.

DETAILED DESCRIPTION OF THE PREFERRED EMBODIMENT

A sliding joint 10 illustrated in FIG. 1 comprises a socket 12 integral with a portion of a first shaft 14, intended, for example, to be driven from an engine unit of a motor vehicle, and a tripod 16 carrying three journals 18 which are distributed angularly at 120° and on which are rotatably mounted rollers 20 of spherical form received between pairs of straight rolling tracks 22. The tripod 16 comprises a hub equipped, on its inner periphery, with splines or serrations 24 which interact with corresponding serrations or splines of the end 26 of a second shaft 28 intended, for example, to be connected to a driving wheel of the vehicle.

To ensure that the transmission joint 10 is protected and is filled with grease in a leakproof manner, the latter is equipped with a protective sealing cover 30 and with an elastic sealing bellows 32.

The protective cover 30 is a piece of sheet-material of generally cylindrical form. It can also be produced from plastic.

In the vicinity of its first end, that is to say that end facing the first shaft 14 (on the right as seen in FIG. 1), the cylindrical cover is mounted on the outer wall 34 at the socket 12, with a gasket 36 interposed therebetween. The gasket 36 is arranged on a reduced diameter machined cylindrical part 38 of the rough outer surface 34 of the socket 12.

The machined cylindrical portion 38 is completed by a radial annular surface 40 machined on the rear face of the socket confronting the first shaft 14.

As can be seen from FIG. 3, the first end 33 of the cover 30 interacting with the gasket 36 has a stepped profile, of which a portion 42 of smaller diameter is centered on the machined cylindrical part 38.

According to the invention, the diameter of the central part of the protective cover 30 and the radial thickness of the gasket 36 are selected so as to provide a radial play "j" between an inner peripheral surface 44 of the cylindrical cover 30 and the rough outer peripheral surface 34 of the socket 12 located opposite the inner wall 44.

The first end 33 of the cylindrical cover 30 ends in a turned-down inner radial portion forming a shoulder 46 which interacts with the machined annular surface 40 to form an axial stop of the cover 30, limiting the axial movements of the latter towards the left, as seen in FIG. 1.

The other end 50 of the cylindrical cover 30 confronting an end 52 of the socket 12 facing the second shaft 28 is mounted centered about a machined cylindrical bearing surface 56 of a diameter reduced in relation to that of the rough outer surface 34.

To provide the radial play "j", the end 50 of the cover 30 is mounted on the cylindrical bearing zone 56 with a cylindrical metal ring 48 interposed therebetween. The ring is immobilized in terms of rotation relative to the body of the socket by any suitable means, such as, for example, notches.

The ring 58 forming a spacer is extended, in the direction of the second shaft 28, that is to say towards the left in FIG. 1, by a portion forming an annular supporting collar 60, intended for receiving, on its outer peripheral surface, an annular heel 62 forming a free end of the sealing bellows 32.

The annular heel 62 is held gripped between the portion forming a collar 60 and a widened portion 64 produced integrally with the cover 30 and extending the end 50 of the cover in the direction of the second shaft 28. The heel 62 is thus immobilized axially and in terms of rotation.

The machined cylindrical bearing zone 56 is completed by a machined radial annular zone 66, against which bears an inner radial shoulder 68 of the cylindrical ring 58.

In order to immobilize the heel 62 axially relative to the cover 30 and the cover 30 relative to the socket 12, there is provided an axial immobilization collar 70 having a rear radial face 72. At the end of the mounting operation, the collar 70 is fitted into the widened portion 64, so as to slightly compress the annular heel 62 against the rear radial face 72, against which it bears axially.

The immobilization collar 70 can be fastened relative to the widened portion 64 of the protective cover 30 by any means, removable or not. Of removable solutions, the immobilization collar pressed against the heel 62 of the bellows can be mounted so as to be snapped in, either by means of studs or notches made in the widened portion 64 of the cover 30 or as a result of the rotational engagement of several lobes formed on the outer periphery of the immobilization collar into corresponding orifices provided in the widened portion 64 of the cover.

The cover is installed and assembled in the following way.

The cover is introduced axially onto the socket from the right, as seen in FIG. 1, after the gasket 36 has previously been fitted and until the shoulder 46 comes to bear on the surface 40.

In this position, the operator, after filing the joint and the sealing bellows with the grease necessary for lubrication, mounts the heel 62 of the bellows, gripped between the collar 60 and the widened portion 64, and then axially immobilizes the assembly as a whole by means of the immobilization collar 70.

At the end of this mounting operation, there is a permanent radial play "j" which avoids the need to execute anything other than greatly reduced machining operations in the vicinity of the two ends of the body of the socket 12.

I claim:

1. A transmission joint assembly, comprising:

a first shaft having a socket connected thereto, said socket defining at least one pair of rolling tracks;

a second shaft having at least one rolling element connected thereto, said rolling element being received in said pair of rolling tracks;

said socket having an outer wall, and said outer wall having an unmachined outer surface;

said socket further having a first end adjacent said first shaft and a second end adjacent said second shaft;

a protective closing cover having a substantially cylindrical shape mounted on said outer wall of said socket such than an inner wall of said cover is radially spaced from said unmachined surface of said outer wall of said socket;

a gasket interposed between said outer wall of said socket at said first end thereof and said cover; and a sealing bellows having a free annular edge sealing against said inner wall of said cover at said second end of said socket;

wherein said outer wall of said socket at said second end has a machined cylindrical bearing zone adjacent said unmachined outer surface of said outer wall for mounting and centering said cover thereon; and wherein an annular ring member is disposed on said machined cylindrical bearing zone of said outer wall of said socket and wherein said free annular edge of said bellows is disposed between said annular ring member and said inner wall of said cover.

2. The transmission joint assembly as set forth in claim 1, and further comprising:

means for holding said free annular edge of said sealing bellows against said inner wall of said cover and mounting said cover to said second end of said socket to ensure that said cover is radially spaced from said unmachined surface of said outer wall from said first end of said socket to said second end.

3. The transmission joint as set forth in claim 1, wherein:

said outer wall of said socket at said first end has a machined cylindrical surface, said gasket being disposed on said machined cylindrical surface.

4. The transmission joint as set forth in claim 3, wherein:

said machined cylindrical surface of said outer wall of said socket has a diameter smaller than said unmachined outer surface of said outer wall of said socket.

5. The transmission joint as set forth in claim 3, wherein:

said socket at said first end thereof further comprises a radial annular machined surface adjacent said machined cylindrical surface; and said cover has an inner radial shoulder for engagement with said radial annular machined surface, whereby said radial annular machined surface serves as an axial stop for preventing axial movement of said cover.

6. The transmission joint as set forth in claim 1, wherein:

said machined cylindrical bearing zone of said outer wall of said socket has a diameter smaller than said unmachined outer surface of said outer wall of said socket.

7. The transmission joint as set forth in claim 1, wherein:

said cover at said second end of said socket has a radially outwardly widened cylindrical portion extending axially toward said second shaft, said free annular edge of said bellows being disposed at said inner wall of said cover at said radially outwardly widened cylindrical portion.

8. The transmission joint as set forth in claim 7, wherein:

said radially outwardly widened cylindrical portion has a collar thereon for axially immobilizing said free annular edge of said bellows and said cover relative to said socket.

9. A transmission joint assembly, comprising:

a first shaft having a socket connected thereto, said socket defining at least one pair of rolling tracks;

a second shaft having at least one rolling element connected thereto, said rolling element being received in said pair of rolling tracks;

said socket having an outer wall, a first end adjacent said first shaft and a second end adjacent said second shaft, said outer wall having an unmachined outer surface;

a protective closing cover having a substantially cylindrical shape mounted on said outer wall of said socket at said first end and said second end thereof such that an inner wall of said cover is radially spaced from said unmachined surface of said outer wall of said socket;

a gasket interposed between said outer wall of said socket at said first end thereof and said cover;

a sealing bellows having a free annular edge sealing against said inner wall of said cover at said second end of said socket; and a ring means for holding said free annular edge of said sealing bellows against said inner wall of said cover and mounting said cover to said second end of said socket;

wherein said outer wall of said socket at said second end has a machined cylindrical bearing zone adjacent said unmachined outer surface of said outer wall for mounting and centering said cover thereon; and wherein said ring means comprises an annular ring member disposed on said machined cylindrical bearing zone of said outer wall of said socket and wherein said free annular edge of said bellows is disposed between said annular ring member and said inner wall of said cover.

10. The transmission joint as set forth in claim 9, wherein:

said annular ring member has a collar pressing said free annular edge of said bellows against said inner wall and a spacer portion radially spacing said cover from said unmachined outer surface of said outer wall of said socket.

* * * * *